United States Patent [19]
Kurozu et al.

[11] Patent Number: 4,909,199
[45] Date of Patent: Mar. 20, 1990

[54] SYSTEM FOR CONTROLLING IGNITION DEVICE FOR VEHICLE

[75] Inventors: Tomotaka Kurozu, Atsugi; Yoshimitsu Takeda, Zama; Hiroyuki Asano, Tokyo; Terukiyo Murakami; Yuichi Abe, both of Yokohama, all of Japan

[73] Assignee: Nissan Motor Co., Ltd., Japan

[21] Appl. No.: 222,811

[22] Filed: Jul. 21, 1988

[30] Foreign Application Priority Data

Sep. 10, 1987 [JP] Japan .............................. 62-226957
Oct. 19, 1987 [JP] Japan .............................. 62-263192

[51] Int. Cl.$^4$ ....................... B60R 25/04; B60R 25/02
[52] U.S. Cl. ........................... 123/146.5 B; 123/198 B; 70/352
[58] Field of Search ................. 123/198 B, 146.5 B; 70/252, 254, 255; 307/10 A; 200/61.5; 180/287

[56] References Cited

U.S. PATENT DOCUMENTS

| | | | |
|---|---|---|---|
| 3,401,544 | 1/1967 | Fraser | 70/248 |
| 3,490,255 | 12/1967 | Wight et al. | 70/252 |
| 3,566,632 | 5/1968 | Wall et al. | 70/248 |
| 3,590,612 | 11/1969 | Henning | 70/239 |
| 3,782,493 | 1/1974 | Lipschutz et al. | 70/254 |
| 3,827,526 | 8/1974 | Smith | 123/146.5 B |
| 3,917,021 | 8/1974 | Williams et al. | 70/255 |
| 3,940,958 | 12/1974 | Kuroki | 70/186 |
| 4,218,717 | 8/1978 | Shuster | 361/79 |
| 4,232,571 | 2/1979 | Kimberlin | 74/878 |
| 4,258,560 | 6/1979 | Jessop | 70/252 |
| 4,270,624 | 7/1979 | Jessop | 180/287 |
| 4,332,306 | 6/1982 | Turatti | 70/252 |
| 4,712,397 | 12/1987 | Niskanen | 70/254 |
| 4,759,203 | 7/1988 | Lieb et al. | 70/185 |
| 4,771,619 | 9/1988 | Shiramizu et al. | 70/252 |
| 4,773,241 | 9/1988 | Peitsmeier et al. | 70/252 |

FOREIGN PATENT DOCUMENTS

| | | | |
|---|---|---|---|
| 3616122A1 | 5/1986 | Fed. Rep. of Germany | 70/352 |
| 2176373 | 10/1973 | France | 70/352 |
| 2499005 | 1/1981 | France | 70/352 |
| 2499006 | 2/1981 | France | 70/352 |
| 57-164840 | 10/1982 | Japan | 70/352 |
| 57-164841 | 10/1982 | Japan | 70/352 |
| 2160485A | 6/1984 | United Kingdom | 70/352 |

Primary Examiner—Raymond A. Nelli
Attorney, Agent, or Firm—Lowe, Price, LeBlanc, Becker & Shur

[57] ABSTRACT

A system for controlling an ignition device for a motor vehicle comprises a key operated movable member, a blocking mechanism for automatically blocking the key operated movable member against return movement once the key operated movable member has moved beyond a predetermined position, and means responsive to a predetermined condition of the vehicle for restraining a manual release member of the blocking mechanism from actuation for releasing the blocking mechanism.

15 Claims, 11 Drawing Sheets

SYSTEM FOR CONTROLLING IGNITION DEVICE FOR VEHICLE

BACKGROUND OF THE INVENTION

The present invention relates to a system for controlling an ignition device for vehicles, and more particularly to a system for controlling movement of a key operated movable member of an engine ignition device such that the key operated movable member will not return once the key operated movable member has moved beyond a predetermined position until the vehicle assumes a predetermined condition, even though such return movement is permitted if a manual release member is operated after the vehicle has attained the predetermined condition.

The present invention is applied to a motor vehicle equipped with an engine ignition device operable by a key operated member and a parking mechanism. The parking mechanism is operated when a manual shift lever is placed at a "P" (Parking) position in a motor vehicle with an automatic transmission or when a manual parking brake lever is pulled in a motor vehicle with a manual transmission. The vehicle therefore assumes a predetermined condition where it is forced to stay at a halt and thus it will not move.

Usually, the engine ignition device includes an ignition switch incorporated in a locking device for a vehicle steering mechanism and is operable by a key operated rotatable lock cylinder disposed in a stationary cylinder housing. When a proper key is inserted in a key slot formed in the lock cylinder, the lock cylinder is rotatable from a "LOCK" position to an "ON" position beyond an "ACC" position, and then to a "START" position. The "ACC" position, "ON" position and "START" position correspond to respective operating positions, namely "ACC", "ON" and "START", of the ignition switch. The locking device carries in a housing a locking bolt, such that when it is suitably mounted on a motor vehicle steering column, the bolt may extend into the steering column to lock a steering shaft extending through the steering column. In order to prevent inadvertent rotation of the key operated lock cylinder to the "LOCK" position, the locking device usually comprises a mechanism for automatically blocking the key operated lock cylinder against return movement to the "LOCK" position once the key operated lock cylinder has moved beyond the predetermined position. The blocking mechanism includes a blocking pawl which is movable to a blocking position by means of a rotary cam rotatable with the key operated lock cylinder and retained in the blocking position once the key operated lock cylinder has moved beyond the predetermined position from the "LOCK" position. A manual button is disposed in the vicinity of the hole which can be depressed when the key operated lock cylinder returns to an "OFF" position to move the blocking pawl from its blocking position to a released position. Thus, the key operated lock cylinder can be returned to the "LOCK" position if the manual button is depressed and the key can be removed from the key operated lock cylinder when and only when the key operated lock cylinder has returned to the "LOCK" position.

Drivers' behavior differs from one person to another. For instance a driver may leave the vehicle with the shift lever of the automatic transmission placed at "R" (Reverse) range position rather than returning it to the "P" (Parking) position when the vehicle is parked on a slope. In this case, if he or another person tries to start the engine by inserting the key into the lock cylinder and rotating it to the "START" position, the engine will not start running until the shift lever is returned to the "P" or "N" (Neutral) position.

An object of the present invention is to eliminate this cumbersome operation which would otherwise be required upon re-starting the engine subsequently.

More particularly, an object of the present invention is to provide a system for controlling an ignition device such that a driver of a motor vehicle is always motivated to force the vehicle to stay at a halt before removing a key from a lock cylinder so as to eliminate the above-mentioned cumbersome operation which would otherwise be required upon re-starting the engine subsequently.

SUMMARY OF THE INVENTION

According to the present invention, there is provided in a motor vehicle with a system for controlling an ignition device. This system comprises a key operated movable member; means for automatically blocking the key operated moveable member against return movement once the key operated moveable member has moved beyond a predetermined position, the blocking means including a manual release member; and means for restraining the manual release member from an actuation thereof in releasing the blocking means until the motor vehicle assumes a predetermined condition where it is forced to stay at a halt subsequently after said key operated moveable member has moved beyond said predetermined position.

DETAILED DESCRIPTION OF THE INVENTION

Figures 1, 2:
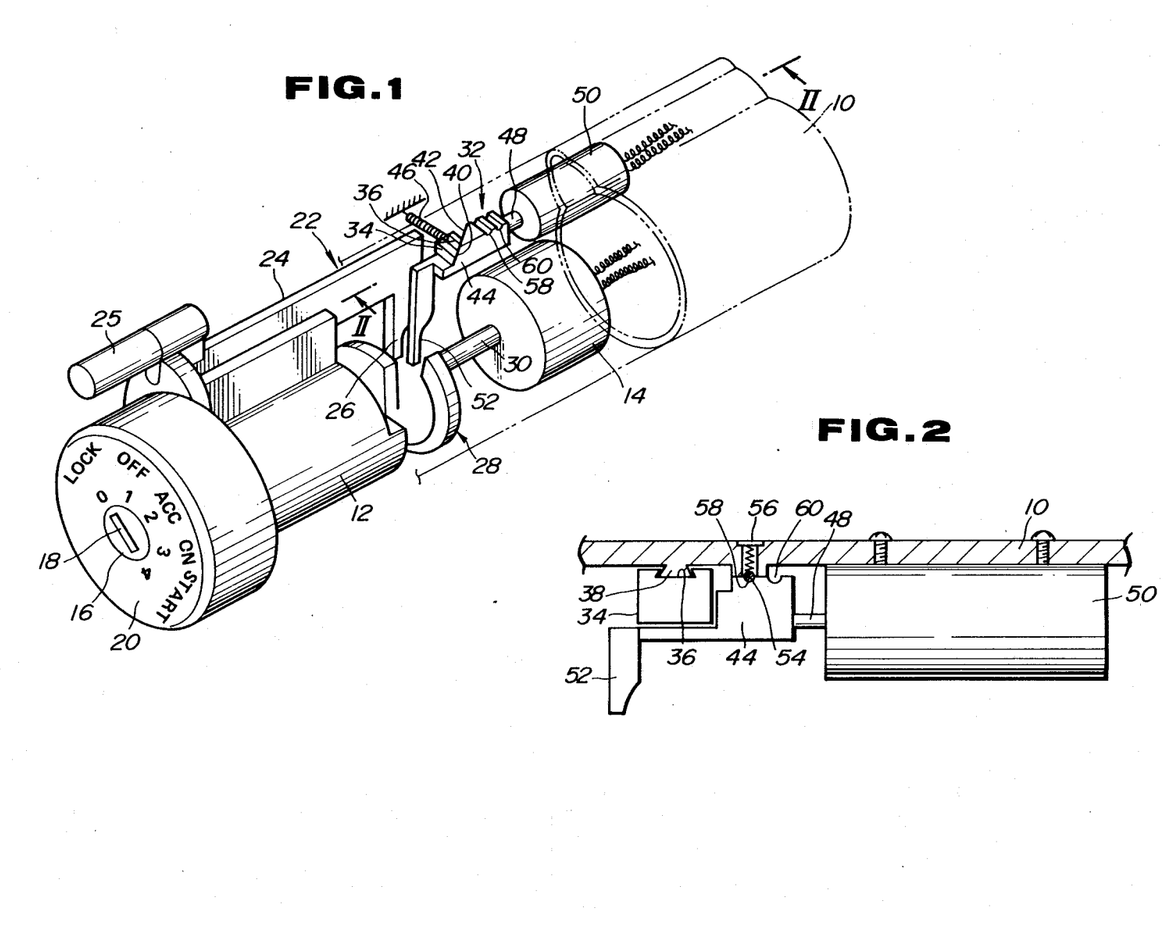
FIG. 1 is a perspective diagrammatic view showing a mechanical part of a first embodiment according to the present invention.
FIG. 2 is a fragmentary view partly section through the line II—II of FIG. 1.

Referring now more particularly to the drawings and especially to FIG. 1, a casing 10 shown in phantom line is formed with a bore accommodating therein a stationary cylinder housing 12 and an ignition switch 14. The cylinder housing 12 is secured to the casing 10. A key operated inner cylinder 16 has a key slot 18 and is rotatable in the outer cylinder housing 12 when a proper key (not shown) is inserted into the key slot 18.

A face plate 20 has formed thereon markings such as "LOCK", "OFF", "ACC", "ON", and "START", at positions corresponding to respective operating positions of the ignition switch 14, and is fixed relative to the casing 10.

A blocking mechanism generally indicated by a reference numeral 22 comprises a L-shaped blocking member 24 accommodated in the bore of the casing 10 and extending generally in parallel to the axis about which the key operated cylinder rotates. It is formed with a blocking pawl 26 and axially movable from a rest position as illustrated in FIG. 1 to the left as viewed in FIG. 1 to a blocking position by the control of a rotary cam 28 when the key operated inner cylinder 16 is rotated beyond the "OFF" position (clockwise as viewed in FIG. 1) from the "LOCK" position as illustrated. A manual release button 25 is fixedly connected to the left end, as viewed in FIG. 1, of the blocking member 24.

The rotary cam 28 is attached to the right end, as viewed in FIG. 1, of the key operated inner cylinder 16 to be rotatable therewith. A spindle 30 extends from the right end of the cam 28, as viewed in FIG. 1, to the ignition switch 14 for operable rotational engagement therewith.

Figures 9, 10:
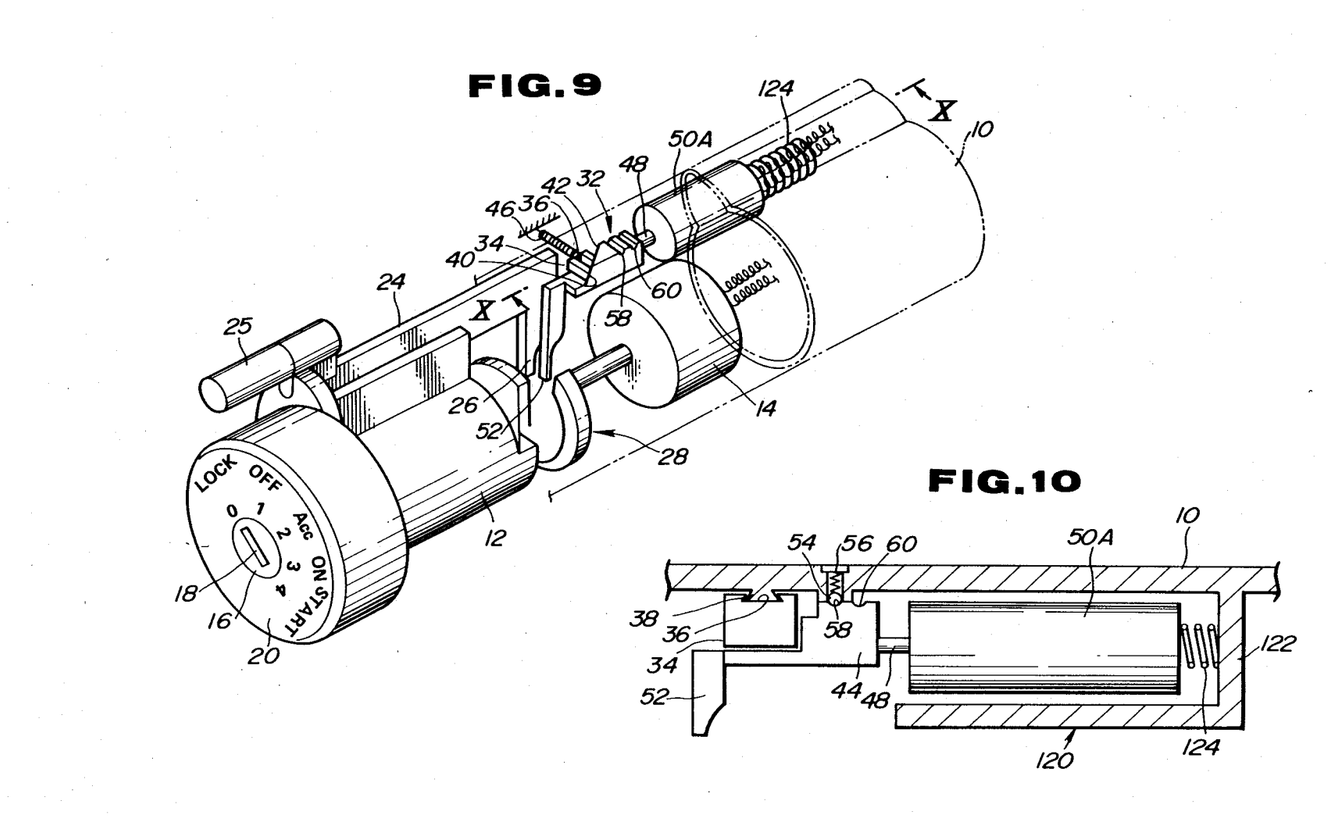
FIGS. 9 and 10 are similar views to FIGS. 1 and 2, respectively and show a fourth embodiment.

A restraining mechanism generally designated by a reference numeral 32 comprises a restraining block 34 carried by the housing 10 for movement in a peripheral direction with respect to the cylindrical housing 12. As best seen in FIG. 2, the restraining block 34 is formed with a dovetail groove 36 receiving therein a projection 38 formed on the inner wall of the casing 10. The block 34 is formed with an inclined guide face 40 slidably engaged with an inclined cam face 42 formed on a reciprocal cam 44. This slidable engagement of the block 34 with the reciprocal cam 44 is maintained by the bias of a spring 46 bearing between the block 34 and the inner wall of the casing 10. The reciprocal cam 44 has one end fixed to an end of a plunger 48 of a solenoid actuator 50 accommodated in the casing 10 and fixedly secured to the inner wall thereof as best seen in FIG. 10. Extending from the opposite end of the reciprocal cam 44 is a guide arm 52 having its end portion engaged with the rotary cam 28. The reciprocal cam 44 is movable between a first position as illustrated in FIGS. 1 and 2 where a detent ball 54 loaded by a detent spring 56 is received in a first detent groove 58 formed in the cam 44 and a second position where the detent ball 54 is received in a second detent groove 60 formed in the cam 44. In the illustrated first position, the restraining block 34 assumes a rest position as illustrated in FIG. 1 and it is out of abutting engagement with the right end of the blocking member 24 as viewed in FIG. 1 allowing axial movement of the blocking mechanism 24. If the reciprocal cam 44 is moved from the first position to the second position, the restraining block 34 is moved against the spring 46 to a restraining position where once the blocking member 24 has assumed the blocking position, the restraining block 34 comes into abutting engagement with the right end of the blocking member 24 as viewed in FIG. 1 and restraining the movement of the blocking member 24 out of the blocking position thereof.

In the illustrated position in FIG. 2, the plunger 48 is in its retracted position. If the key operated cylinder 16 and thus the rotary cam 28 moves from the "LOCK" position beyond the "ON" position, the guide arm 52 is pulled to the left as viewed in FIG. 2 until the reciprocal cam 44 assumes the second position thereof. During this movement, the plunger 48 of the solenoid actuator 50 is pulled from the retracted position thereof to a extracted position thereof. The solenoid actuator 33 is of the type wherein when energized it retracts the plunger 48 to the retracted position thereof but when deenergized it allows the plunger 48 to be pulled out from the retracted position thereof to the extracted position thereof.

Figures 4A, 4B, 4C, 4D, 4E, 4I, 4J, 4K:
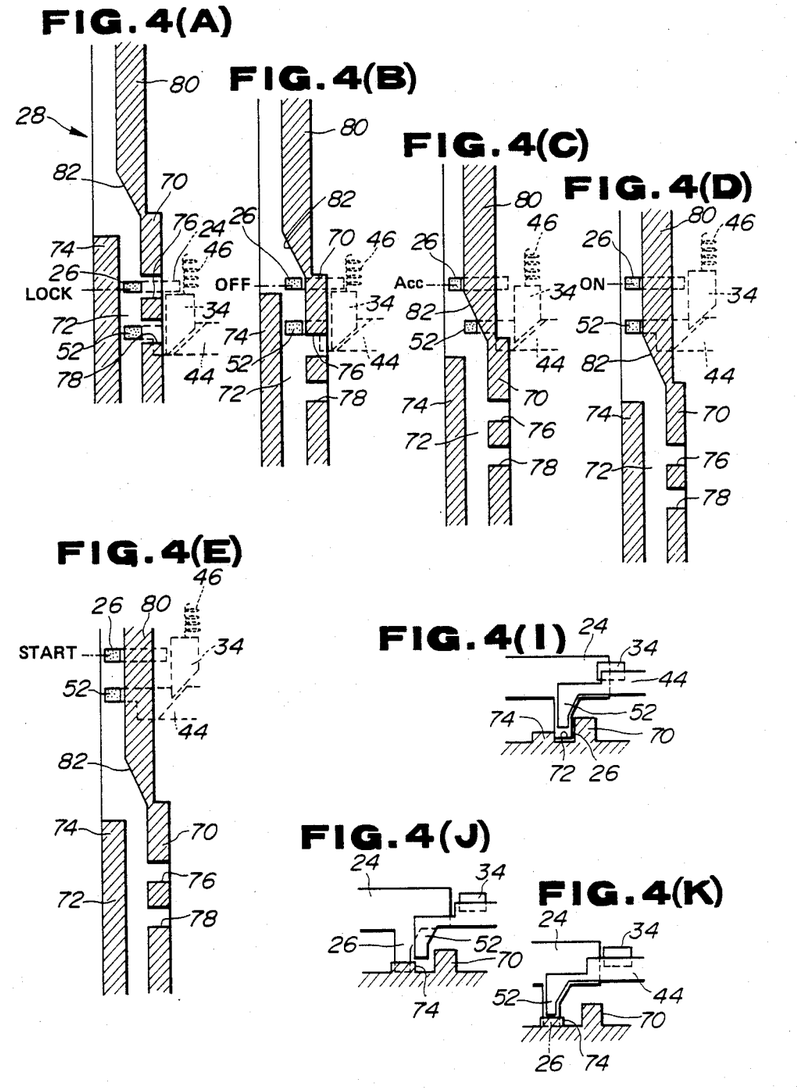
FIGS. 4(A), 4(B), 4(C), 4(D), 4(E), 4(I), 4(J) and 4(K) are diagrammatic views showing the position of parts with respect to various positions assumed by the rotary cam rotatable with the key operated cylinder.

Referring to FIGS. 4(A), 4(B), 4(C), 4(D) and 4(E), the rotary cam 28 is further described. FIG. 4(A) is an envelope open diagrammatic view of the cam 28 as viewed from the top in FIG. 1. In this and each of the similar FIGS. 4(B) to 4(E), radially extending guide walls of the rotary cam 28 are designated by shadowed area, and the blocking member 22 and guide arm 52 are illustrated by broken line with their ends designated by dots, for ease of recognition. FIGS. 4(A), (B), (C), (D) and (E) illustrate positions of parts when the key operated cylinder 16 is rotated from the "LOCK" position as shown in FIG. 4(A), "OFF" position as shown in FIG. 4(B), "ACC" position as shown in FIG. 4(C), "ON" position as shown in FIG. 4(D) and to the position "START" as shown in FIG. 4(E). FIG. 4(I) is a view as viewed from the bottom of FIG. 4(A), FIG. 4(J) is a view as viewed from the bottom of FIG. 4(C), and FIG. 4(K) is a view as viewed from the bottom of FIG. 4(D).

In the "LOCK" position as shown in FIGS. 4(A) and 4(I), the blocking pawl 26 has its end engaged with a relatively tall radially extending guide wall 70 and received in a groove 72 formed between the relatively tall guide wall 70 and a relatively low guide wall 74 lying opposite to the guide wall 74. The guide arm 52 has its end engaged with the relatively tall guide wall 70 but will not engage with the relatively low guide wall 74. Two cutouts 76 and 78 are formed through the guide wall 70 to allow passage of the blocking pawl 26 and guide arm 52 through the guide wall 70 during assembly. The relatively tall guide wall 70 is connected with a second relatively tall guide wall 80 which is as tall as the guide wall 70. The axially inward radial surface of the guide wall 70 is connected via an inclined surface with the axially inward radial surface of the guide wall 80. The dimensions of the blocking pawl 26 and the guide arm 52 are chosen such that the blocking pawl 26 is in slidable engagement not only with the axially inward radial surfaces of the guide walls 70 and 80 but also with an axially inward radial surface of the guide wall 74, while the guide arm 52 is out of engagement with the axially inward radial surface of the guide wall 74.

Figure 3:
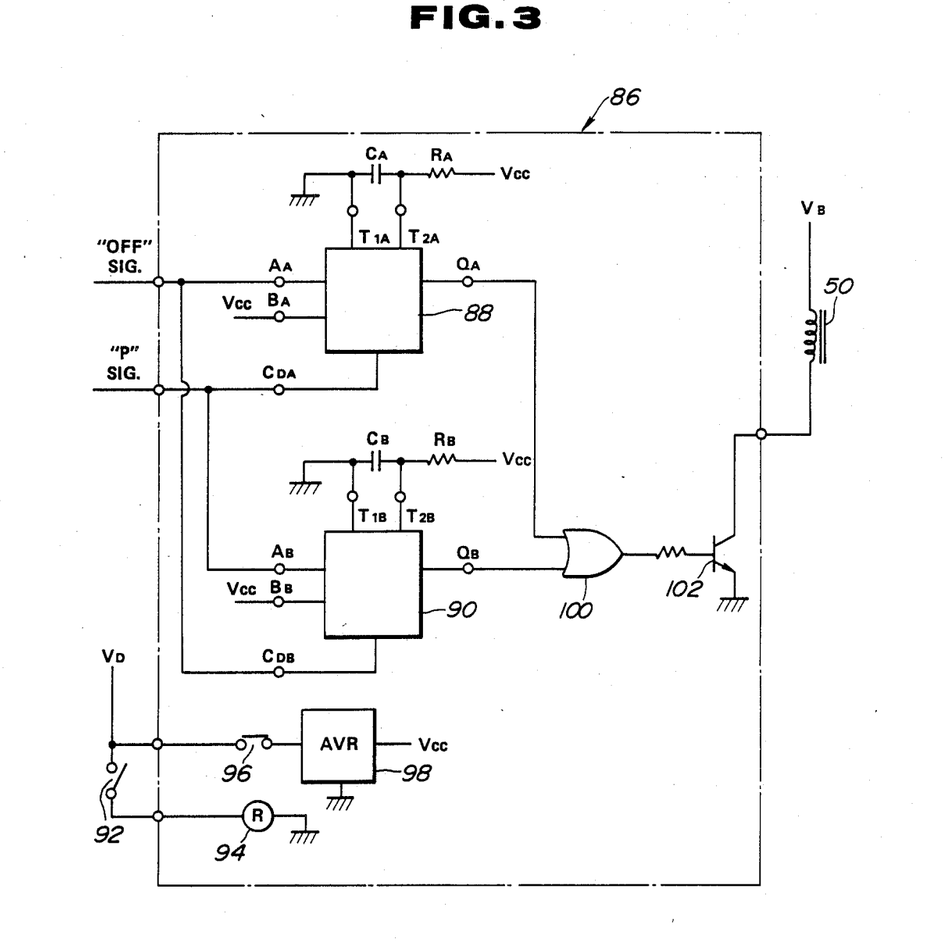
FIG. 3 is a control part of the first embodiment according to the present invention.

Referring to FIG. 3, a control circuit 86 for selectively energizing the solenoid of the solenoid actuator 50 is described. This control circuit 86 is supplied with three input signals. Among them, a so-called "OFF" position indicative signal, which assumes a high level (Hi) when the key operated cylinder 16 assumes the "OFF" position, is supplied from the ignition switch 14 to terminals $A_A$ and $C_{DB}$ of one-shot multivibrators 88 and 90, respectively. Next, a so-called "P" position indicative signal, which assumes a high level (Hi) when the shift lever assumes the "P" (Parking) position, is supplied to terminals $C_{DA}$ and $A_B$ of the one-shot multivibrators 88 and 90, respectively. Last, a key insertion indicative signal is derived from a key switch 92 which is closed upon insertion of the proper key into the key operated cylinder 16. When the key switch 92 is closed, a relay 94 is activated to close a pair of relay contacts 96, thus causing a voltage $V_D$ to be applied to an automatic voltage regulator (AVR) 98. The AVR 98 serves as a source of constant voltage $V_{CC}$ applied to terminals $B_A$ and $B_B$ of the one-shot multivibrators 88 and 90, respectively. Output terminals $G_A$ and $G_B$ of the one-shot multivibrators 88 and 90 are supplied to inputs of a logical OR gate 100 whose output is applied to a base of a transistor 102. When the transistor 102 is rendered ON, an electric current is allowed to pass through the solenoid 50 to energize same owing to the provision of a source of electric power $V_B$.

Referring to FIGS. 4(A) to 4(E), 4(I) to 4(K), FIGS. 5(F) to 5(H), 5(L) and 5(M), and FIG. 6, an operation of this embodiment is described.

The key can be inserted into or removed from the key operated cylinder 16 when key operated cylinder 16 and the rotary cam 28 rotatable therewith is in the "LOCK" position as illustrated in FIG. 4(A). In this position, the blocking pawl 26 and the guide arm 52 are in alignment with the cutouts 76 and 78, respectively. When the key is inserted into the key slot 18, the key switch 92 is closed detecting this insertion of the key, energizing the relay 94 to close the relay contacts 96, thus causing the AVR 98 to apply voltage $V_{CC}$ to the various terminals of the control circuit 86.

When the key operated cylinder 16 is rotated from the "LOCK" position to the "OFF" position, the rotary cam 28 moves to the position as illustrated by FIG. 4(B) and the cutouts 76 and 78 move away from the blocking pawl 26 and the guide arm 52, respectively.

Further rotation of the key operated cylinder 16 to the "ACC" position as illustrated by FIGS. 4(C) and 4(J), the guide wall 80 moves the blocking pawl 26 to the left as viewed in FIGS. 4(B) and 4(C) to the blocking position where the blocking pawl 24 is engaged with the axially inward radial surface of the guide wall 80.

Further rotation of the key operated cylinder 16 to the "ON" position as illustrated in FIGS. 4(D) and 4(K) causes the guide wall 80 to move the guide arm 52 to the right as viewed in FIG. 4(C) to move the cam 44 to the second position thereof, thus pushing the restraining block 34 against the spring 46 to the restraining position thereof where the restraining block 34 is in abutting engagement with the end of the blocking member 24 from which the blocking pawl 26 extends.

Further rotation of the key operated cylinder 16 from the "ON" position to the "START" position as illustrated in FIG. 4(E) causes the guide wall 80 to move in sliding engagement with the blocking pawl 26 and the guide arm 52. The blocking member 24, integral with the blocking pawl 26, is kept at the blocking position by the restraining block 34 in the restraining position and the reciprocal cam 44, integral with the guide arm 52, is retained in the second position by means of the ball retainer 54 (see FIG. 2).

Figure 5F:
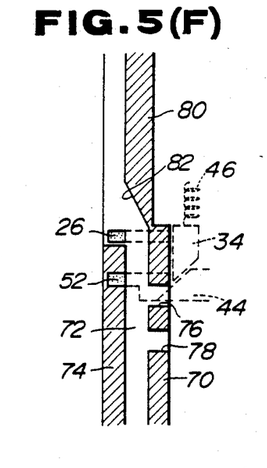
FIGS. 5(F), 5(G), 5(H), 5(L) and 5(M) are similar diagrammatic views.

Subsequently, when the key operated cylinder 16 is returned from the "ON" position to the "OFF" position as illustrated in FIG. 5(F), the guide arm 52 moves over the relatively low radial guide wall 74, but the blocking pawl 26 comes into abutting engagement with the boundary end of the guide wall 74. Thus, further return movement toward the "LOCK" position is blocked by this abutting engagement of the blocking pawl 26 with the end of the guide wall 74. In this position illustrated in FIG. 5(F), the restraining block 34 restrains movement of blocking member 24 in a direction to disengage the blocking pawl 26 from the end of the guide wall 74 so that the manual control member 25 will not move the blocking member 24 in such direction even if pressed by a driver.

Figure 6:
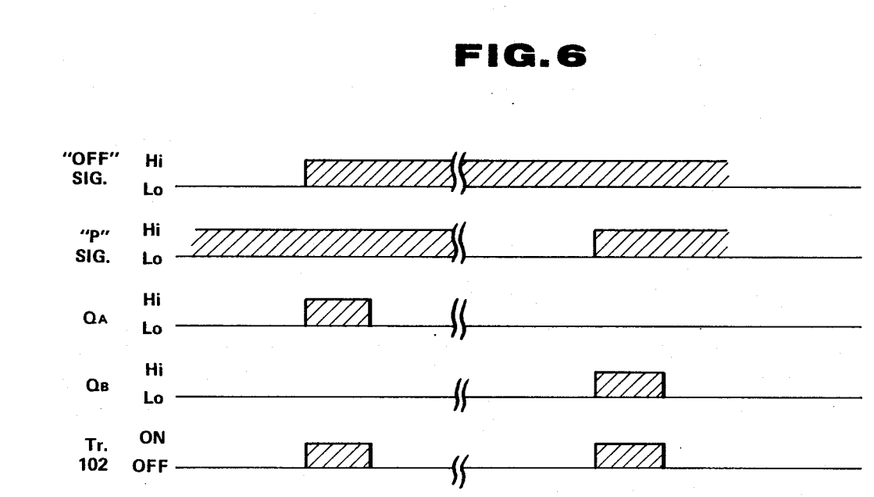
FIG. 6 is a time chart.

However, if the shift lever of the automatic transmission is shifted to the "P" (Parking) position, the "P" position indicative signal assumes the high (Hi) level. Since the "OFF" position indicative signal has already assumed the high (Hi) level corresponding to the return movement of the key operated cylinder 16 to the "OFF" position, the signal at the output terminal $Q_B$ becomes high (Hi) level for a predetermined time and thus the output of the OR gate 100 turns to the high (Hi) level to render the transistor 102 on for the predetermined time. The trailing half of the time chart shown in FIG. 6 shows the above described behavior of the signals. As a result, immediately after the shift lever is placed to the "P" position, the solenoid actuator 50 is energized for the predetermined time.

If the shift lever has been shifted to the "P" position before the key operated cylinder 16 returns to the "OFF" position, the signal at the output terminal $Q_A$ becomes high (Hi) level immediately after the "OFF" position indicative signal turns to the high (Hi) level since the "P" position indicative signal has already assumed the high (Hi) level. The leading half of the time chart shown in FIG. 6 illustrates this behavior of signals. Thus, the solenoid actuator 50 is energized immediately after the return movement of the key operated cylinder 16 to the "OFF" position when the shift lever has been already shifted to the "P" position.

Figure 5G:
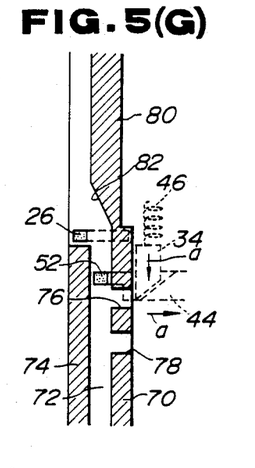
Figure 5H:
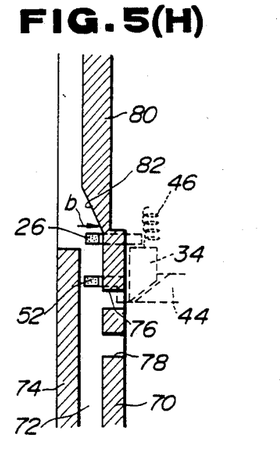
Figure 5L:
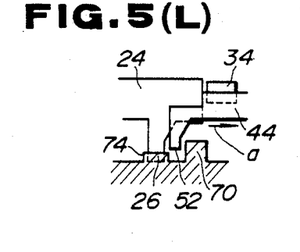
Figure 5M:
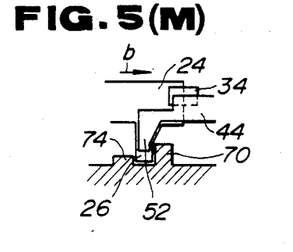

This energization of the solenoid actuator 50 causes movement of the reciprocal cam 44 from the position illustrated in FIG. 5(F) to the position illustrated in FIG. 5(G) or 5(L), permitting the spring 46 to move the restraining block 34 from the restraining position illustrated in FIG. 5(F) to the position illustrated in FIG. 5(G). Small arrows indicated by the character a show the direction of the above-mentioned movements of the parts.

Now, it is possible to press the manual control member 25 to move the blocking member 24 and pawl 26 out of blocking position illustrated in FIG. 5(G) to the position illustrated in FIG. 5(H). Small arrows indicated by reference character b show direction of movement of the blocking member 24 in response to pressing on the manual control member 25. Return movement of the key operated cylinder 16 from the "ON" position as illustrated in FIG. 5(H) to the "LOCK" position is now permitted and the key can be removed from the key operated cylinder when and only when it is in the "LOCK" position.

In the previously described embodiment, the "P" position indicative signal which turns to the high (Hi) level when the shift lever is moved to the "P" (Parking) position has been used as a signal indicative of a predetermined condition of the vehicle where the vehicle is forced to stay at a halt. Alternatively, a "P" position indicative signal which turns to the high level when the manual parking brake has been set to the parking position may be used.

In the control circuit 86, the AVR 98 is used because CMOS integrated circuits are employed. Such AVR may be eliminated if TTL type IC is employed in the control circuit 86. The "OFF" position indicative signal is used as one of input signals to the control circuit 86 using a circuit including the switch 92 specially designed for this purpose. Without the provision of such switch, the "OFF" position indicative signal may be obtained as an output of a logical NAND which has inputs fed with signals indicative of the "ACC" position and "ON" position of the ignition switch 14.

Figures 7, 8:
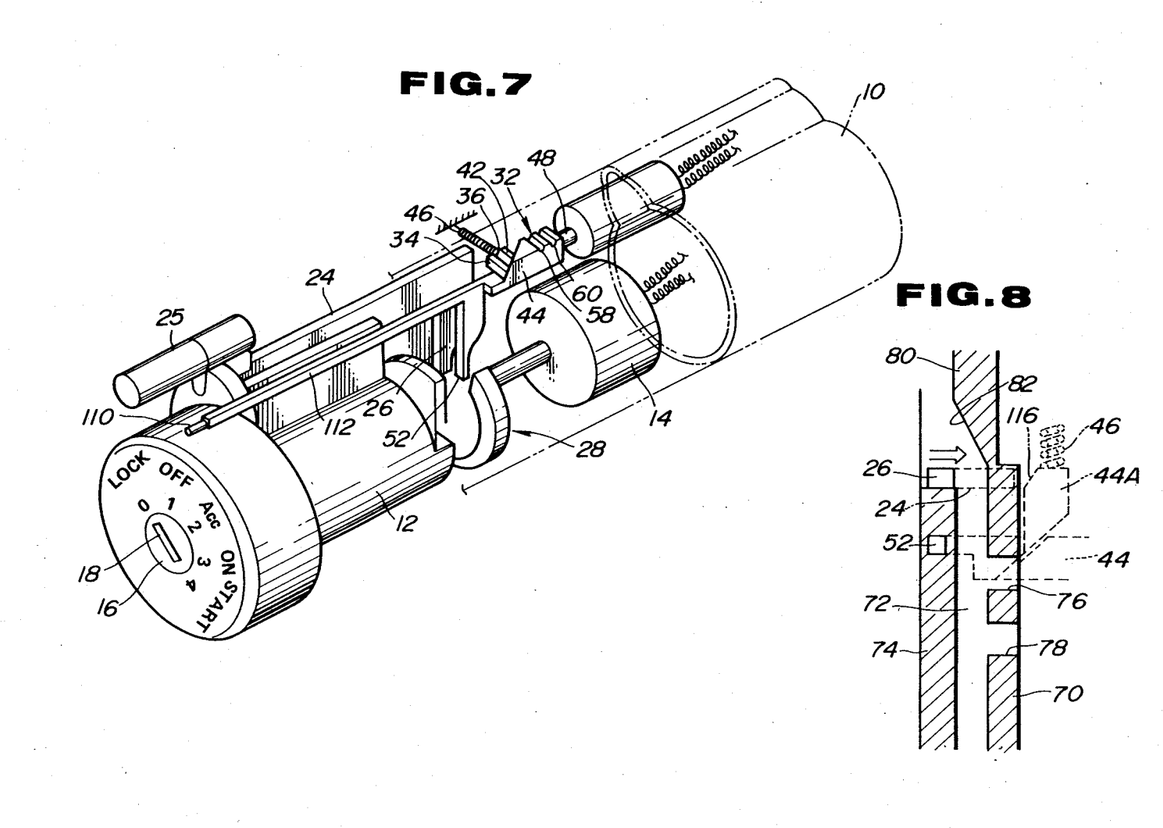
FIG. 7 is a similar view to FIG. 1 showing a second embodiment.
FIG. 8 is a similar view to FIG. 5(F) showing a third embodiment.

FIG. 7 shows a second embodiment of the present invention. This embodiment is substantially the same as the previously described first embodiment except that an emergency button 110 is connected via a rod 112 to a guide arm 52 integral with a reciprocal cam 44. In case of emergency, pressing the emergency button 112 after a key operated cylinder 16 has returned to the position as illustrated in FIG. 5(F) will cause a restraining block 34 to move out of its restraining position, thus rendering manual control member 25 operable.

FIG. 8 shows a third embodiment of the present invention. This embodiment is substantially the same as the previously described first embodiment except that a restraining block 44 is formed with an inclined surface 116, adapted to be engaged by the end of a blocking member 24 when it is in its restraining position. According to this embodiment, even if the restraining block 44A remains in its restraining position, return movement of a key operated cylinder 16 from the position as illustrated in FIG. 5(F) to the "LOCK" position is permitted by pressing a manual release button 25 to cause the end of the blocking member 24 to abut against the inclined surface 116 of the restraining block 44A, moving the restraining block 44A out of the restraining position after the shift lever has been placed to the "P" position, energizing the solenoid actuator 50 to pull its plunger toward the retracted position thereof.

FIGS. 9 and 10 show a fourth embodiment of the present invention. This embodiment aims at facilitating rotation of a key operated cylinder 16 from the "OFF" position as illustrated in FIG. 4(B) to the "ON" position as illustrated in FIG. 4(D). During this rotation, a guide arm 52, cam 44, plunger 48 have to be pulled. In order to accomplish the above-mentioned aim, a solenoid actuator 50A is received in a bore of a retainer housing 120 with an end wall 122 closing one end of the bore, as distinguished from the first embodiment where the solenoid actuator is secured to the housing 10. In order to resiliently hold the solenoid actuator 50A within the retainer housing 120 a spring 124 has one end securely fixed to the end wall and an opposite end securely fixed to inner end of the solenoid actuator 50A. The spring 124 is chosen such that it will not expand by the reaction created when a retainer ball 58 biases a cam 44 during movement of the cam 44 together with a plunger 40 of the solenoid actuator 50A. Let us consider the unitary movement of the guide arm 52, cam 44 and plunger 48 in a direction toward the extracted position of the plunger during rotation of a key operated cylinder 16 from the "OFF" to the "ON" position and then to the "START" position, see FIGS. 4(B) to 4(E). Since, according to this embodiment, the solenoid actuator 50A can move in such a direction as to extend the plunger 48 due to the action of the spring 124, the manual effort in rotating the key operated cylinder can be lowered.

Figure 11:
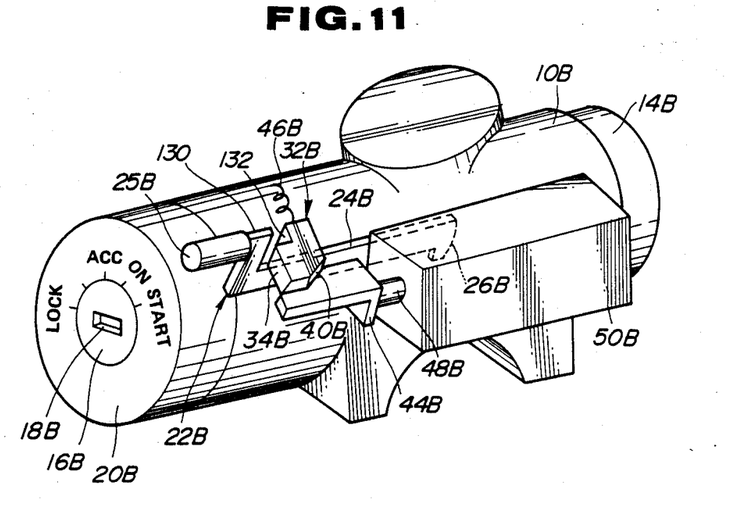
FIG. 11 is a similar view to FIG. 1 showing a fifth embodiment.
Figure 12:
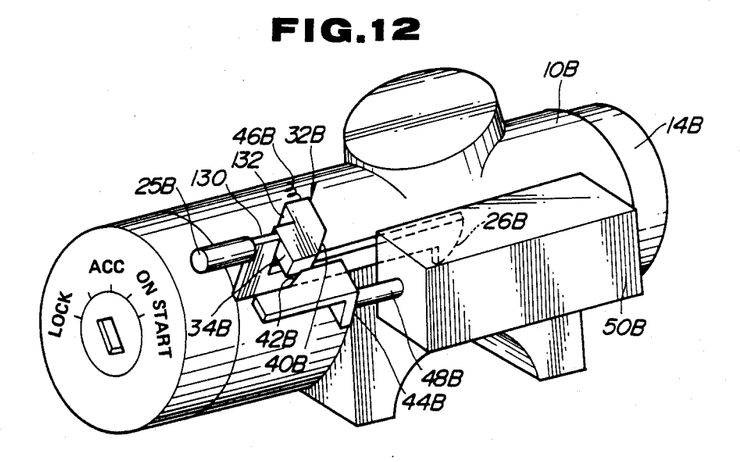
FIG. 12 is a similar view to FIG. 11 showing different position.
Figure 13:
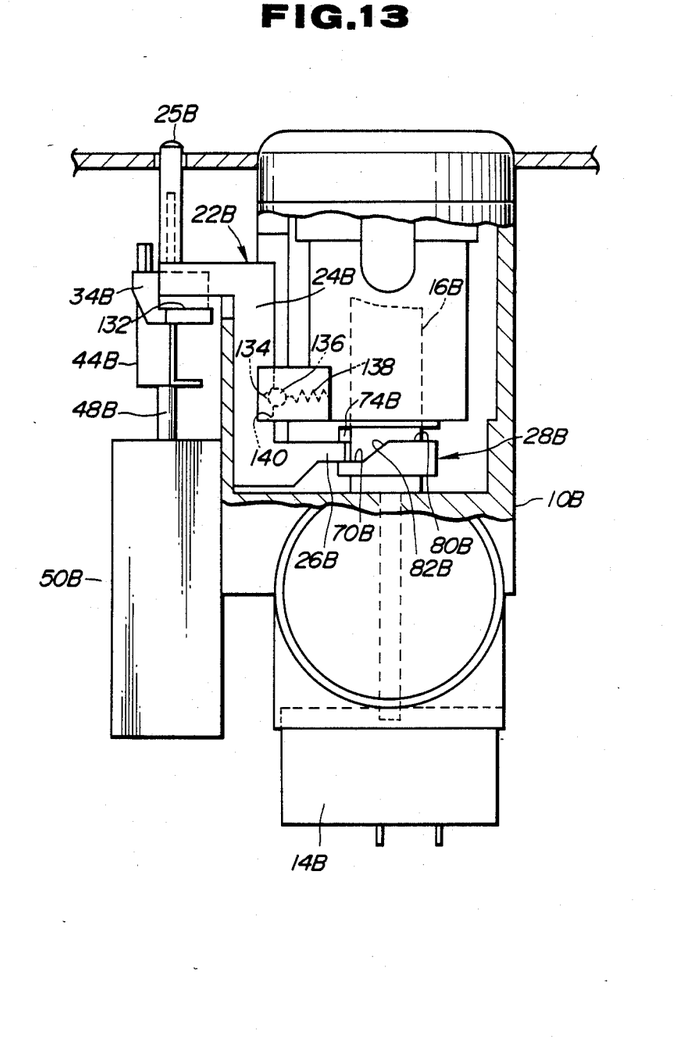
FIG. 13 is a fragmentary section of the embodiment shown in FIG. 11.

Referring to FIGS. 11 to 13, a seventh embodiment of the present invention is described. For ease of description, the same reference numerals used in the previously described first embodiment are used to designate substantially the same or similar parts with the character "B" added.

This embodiment is different from the first embodiment in that a solenoid actuator 50B is of the so-called two-position type so that it can selectively retain a plunger 48B and an integral reciprocal cam 44B in a first position as illustrated in FIG. 11 or a second position as illustrated in FIG. 12. A blocking mechanism 22B is different from the blocking mechanism 22 used in the first embodiment in that a blocking member 24B has a crank end portion 130 to which a manual release button 25B is attached. As illustrated in FIG. 11, a restraining block 34B is formed with a recess 132 which receives the crank end portion 130 to allow movement of the blocking member 24B out of a blocking position as illustrated in FIG. 11 upon depressing the manual release button 25B. As best seen in FIG. 13, the blocking member 24B is formed with a first detent groove 134 which receives a detent ball 136 loaded by a spring 138 when the blocking member 24B in the released position and a second detent groove 140 which is adapted to receive the detent ball 136 when the blocking member 24B has moved to the blocking position.

Figure 14:
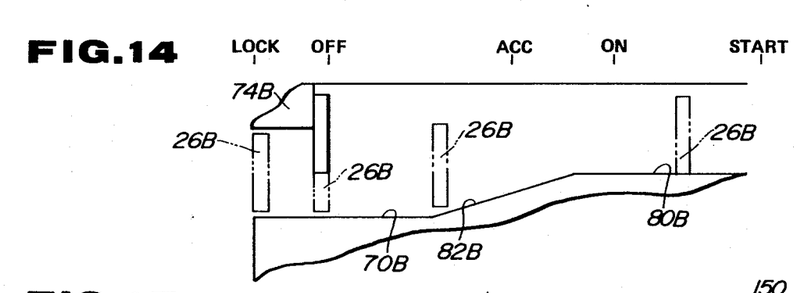
FIG. 14 is a diagrammatic view showing the configuration of the rotary cam.

FIG. 14 diagrammatically shows the relationship between the position of a blocking pawl 26B with respect to positions assumed by the key operated cylinder 16B when the key operated cylinder 16B is rotated from the "LOCK" position to the "START" position. It will be readily understood that the blocking mechanism assumes its blocking position once the key operated cylinder 16B has rotated beyond the "ON" position.

Figure 15:
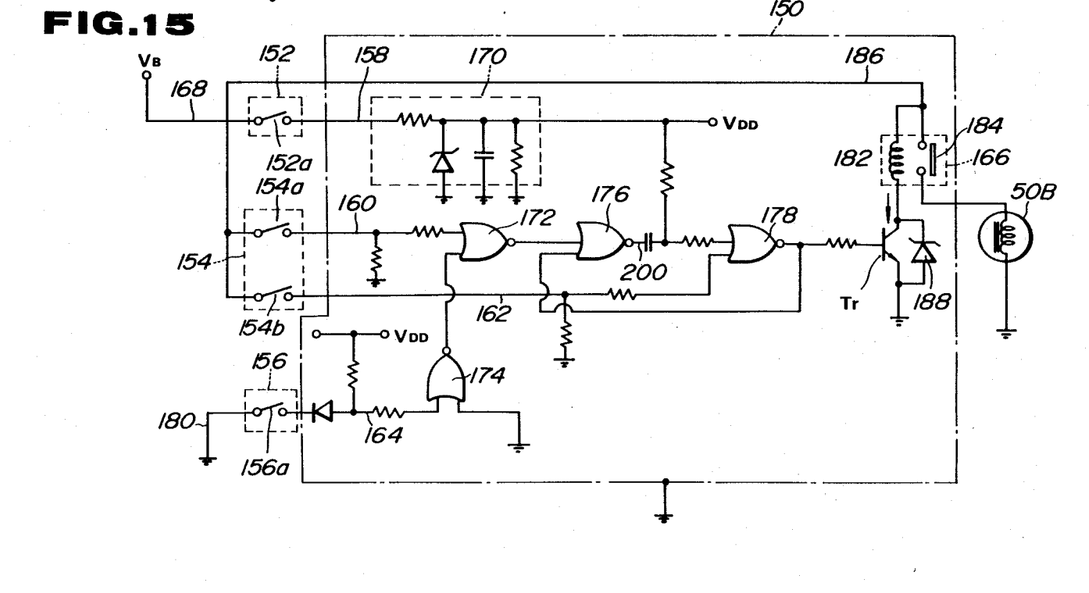
FIG. 15 is a control circuit.

Referring now to FIG. 15, a control circuit 150 for the solenoid actuator 50B is explained. This circuit 150 is supplied with the outputs of each of a key insertion indicative switch 152, an ignition switch 154 and a "P" (Parking) position indicative switch 156. The control circuit 150 includes lines 158, 160, 162 and 164, a transistor Tr, and a relay 166.

The function of the key insertion indicative switch 152 is to indicate whether the key is inserted into the key operated cylinder 16B or not. This switch may be expressed for illustration purpose by a set of switch contacts 152a is connected between the line 158 and a battery line 168 connected to a vehicle battery $V_B$. This set of contacts 152a is closed when the key is inserted into the key operated cylinder 16B to connect the line 158 with the line 168. An automatic voltage regulator (AVR) 170 is provided in the line 158. The AVR 170 generates an electric voltage $V_{DD}$ having a 5 volt.

The function of the ignition switch 154 is to detect whether the key operated cylinder 16B is in the "ACC" position or not. Another function is to detect whether the key operated cylinder 16B is in the "ON" position or not. This ignition switch may be expressed by an "ACC" position detecting contacts 154a and an "ON" position detecting contacts 154b. These contacts 154a and 154b are connected to the line 168 in parallel. The "ACC" position detecting contacts 154a are closed when the key operated cylinder 16B is in the "ACC" position or "ON" position to connect the line 160 with the line 168. The "ON" position detecting contacts 154b are closed when the key operated cylinder 16B is in the "ON" position or "START" position to connect the line 162 with the line 168.

The control circuit 150 includes four logical NOR gates 172, 174, 176 and 178. It is to be noted that the function of the NOR gate 178 is to selectively render the transistor Tr ON, and the output of this NOR gate 178 is fed back to one input of the NOR gate 176.

The function of the "P" (Parking) position indicative switch 156 is to detect whether the shift lever is placed at the "P" (Parking) position or not. For this purpose, a select position sensor for sensing the select position by the shift lever, for example, an inhibitor switch, is used. This "P" position indicative switch 156 may be expressed by "P" position detecting contacts 156a connected to a grounded line 180 and they are opened when the shift lever is in the "P" (Parking) position to interrupt connection of the line 164 with the grounded line 180. This line 164 is connected to one input of the NOR gate 174. The other input of this NOR gate 174 is grounded.

The output of the NOR gate 178 is connected with the base of the transistor Tr. The emitter is grounded and collector is connected with one end of a coil 182 of the relay 166. This coil 62 has a function to close a set of normally open contacts 184. Via the normally open relay contacts 184, the solenoid actuator 50B is connected with a line 186 connected with the batter $V_B$ via the line 168. A zener diode 188 is connected between the collector and emitter of the transistor Tr.

The operation of this control circuit 150 is explained.

When the vehicle is running, since the key is inserted into the key operated cylinder 16B, the key insertion detecting contacts 152a are closed, the "ACC" position detecting contacts 154a and "ON" position detecting contacts 154b are both closed, and the "P" position detecting contacts 33a are opened because the shift lever is placed out of the "P" position. Under this condition, both of the inputs of the NOR gate 174 are 0 levels. The output of the NOR gate 174 is always 1 level except when the shift lever is in the "P" (Parking) position.

The output of the NOR gate 172 is 0 level because both inputs are 1 levels. Since both of the inputs to the NOR gate 178 are 1 levels and thus the output of the NOR gate 178 is 0 level. Thus, the transistor Tr is rendered nonconductive. Thus, the solenoid actuator 50B is not energized and the plunger 48B is kept at its projected position as illustrated in FIG. 12.

After the vehicle has come to a halt, the shift lever is moved to the "P" (Parking) position. Then, the "P" position detecting contacts 156a are opened. Thus, the input of the NOR gate 174 which is connected with the line 164 turns from 0 level to 1 level. As a result, the output of the NOR gate 174 changes from 1 level to 0 level.

Subsequently, the key operated cylinder 16B is rotated from the "ON" position to the "OFF" position disposed between the "ACC" position and "LOCK" position, the "ON" position detecting contacts 154b are opened and the "ACC" position detecting contacts 154a are opened, too. The line 160 is disconnected from the battery line 168, the input to the NOR gate 172 connected with the line 160 becomes 0 level. Since the other input of the NOR gate 172 is 0 level, the output of the NOR gate 172 becomes 1 level.

Since the input to the NOR gate 176 from the output of the NOR gate 172 is 1 level, the output of the NOR gate 176 becomes 0 level irrespective of the signal level at the other input. This causes a capacitor 200 to discharge current, and thus the input to the NOR gate 178 from the capacitor 200 becomes 0 level from 1 level.

The other input to the NOR gate 178 has become 0 level from 1 level because of disconnection of the line 162 from the battery line 168. Thus, the output of the NOR gate changes from 0 level to 1 level. This causes the transistor to become conductive to energize the relay coil 182, closing the relay contacts 184, thus allowing electric current to pass through the solenoid actuator 50B to energize the same. This energization of the solenoid actuator 50B causes the plunger 48B to move from the protruded position as illustrated in FIG. 12 to the retracted position as illustrated in FIG. 11. If in this state, the manual release button 25B is pressed, the key operated cylinder 16B can return to the "LOCK" position and the key can be removed from the key operated cylinder 16B.

When the key is inserted into the key operated cylinder 16B, the charging of the capacitor 200 starts, and thus the input to the NOR gate 178 from the capacitor 200 becomes 1 level. When the key operated lock cylinder 16B is rotated toward the "START" position, the "ACC" position detecting contacts 154a are closed, to cause the input to the NOR gate 172 via the line 160 to become 1 level from 0 level. However, since the "ACC" position detecting contacts 154a are opened again before reaching the "ON" position, the input to the NOR gate 172 via the line 35 returns to 0 level and thus the output of the NOR gate 172 becomes 0 level, causing the output of the NOR gate 176 to become 0 level. This causes discharge of electric current from the capacitor 200, causing the output of the NOR gate 178 to assume the 1 level for a predetermined time, rendering the transistor Tr conductive. As a result, the solenoid actuator 50B moves the plunger 48B to the projected position as illustrated in FIG. 12. Thus, the manual release button become inoperable immediately after the key cylinder 16B has rotated beyond the "ACC" position.

Figure 16:
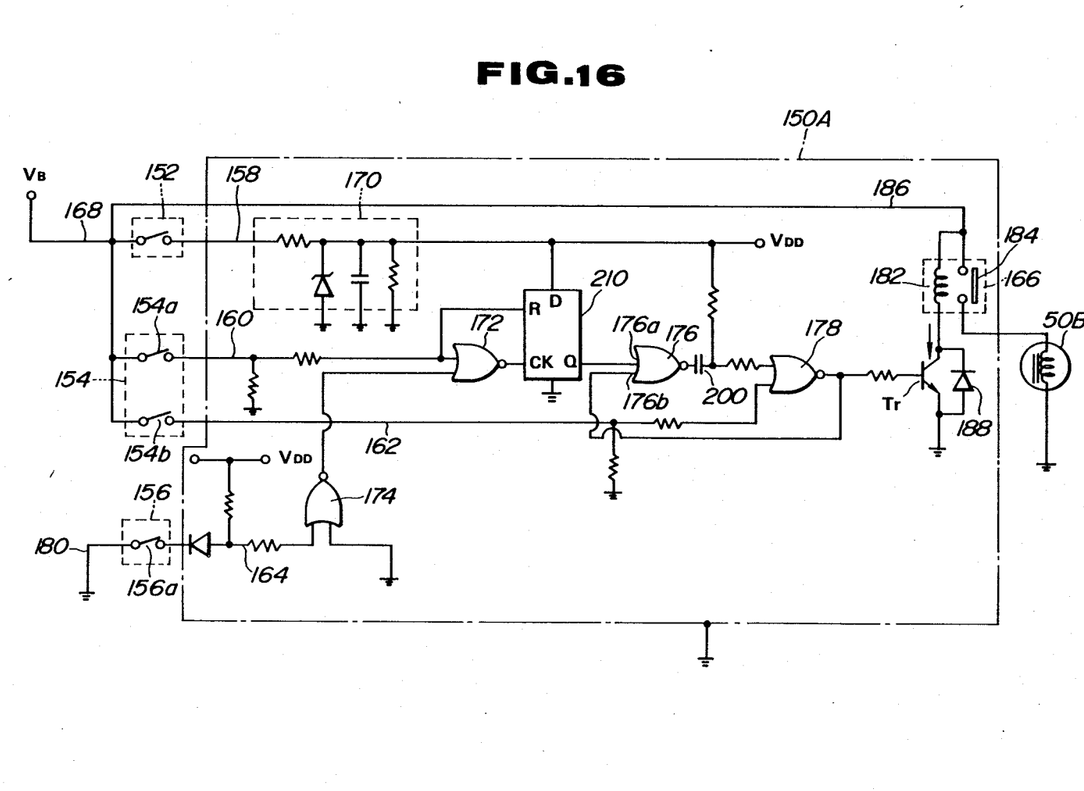
FIG. 16 is an improved control circuit.

FIG. 16 shows another control circuit 150A which is improved over the control circuit 150 in the provision of a flip-flop 210 between a NOR gate 172 and a NOR gate 176. The D terminal of the flip-flop 210 is connected with a line 158, the R terminal is connected with a line 160, the CK terminal is connected with the output of the NOR gate 172, and the Q terminal is connected with one input 176a of the NOR gate 176.

According to this control circuit, even if the shift lever is moved between the "P" position and any of the other positions when the key operated cylinder 16B is in the "OFF" position, the flip-flop 210 is not reset so that the output at the Q terminal stays in 1 level. Thus, discharge of capacitor 200 will not take place, keeping the output of the NOR gate 178 at 0 level, so that the transistor Tr will not be rendered conductive. Therefore, even if the shift lever is moved from the "P" position, the key cylinder 16B can be returned to the "LOCK" position.

What is claimed is:

1. A system for controlling an ignition device for a motor vehicle, under condition where the motor vehicle is placed into a predetermined condition where it is forced to stay stopped, comprising:
 a key operated moveable member;
 means for automatically blocking said key operated moveable member against return movement to a position permitting key removal from said key operated movable member once said key operated moveable member has moved beyond a predetermined position, said blocking means including a manual release member, and means for restraining said manual release member from an actuation resulting in releasing of said blocking means until the motor vehicle is placed in said predetermined condition after said key operated moveable member has moved beyond said predetermined position.

2. A system as claimed in claim 1, wherein said restraining means comprises a restraining block having a restraining position where it restrains movement of a blocking member of said blocking means which is moveable by said manual release member.

3. A system as claimed in claim 1, wherein said restraining means comprises a restraining block, a reciprocal cam cooperating with said restraining block to move said restraining block, and solenoid actuator with a plunger moveable with said reciprocal cam.

4. A system as claimed in claim 3, wherein a solenoid actuator is fixed relative to a housing accommodating said key operated member.

5. A system as claimed in claim 3, wherein a rotary cam is rotatable with said key operated member 6. A system as claimed in claim 5, wherein said reciprocal cam includes a guide arm cooperating with said rotary cam for controlling movement of said reciprocal cam in response to movement of said key operated member.

7. A system as claimed in claim 6, wherein said solenoid actuator is resiliently held in a retainer which is fixed relative to a housing accommodating said key operated member.

8. A system as claimed in claim 6, wherein an emergency button is connected to said reciprocal cam.

9. A system as claimed in claim 6, wherein said restraining block has an inclined cam face cooperating with a blocking member of said blocking means.

10. A system as claimed in claim 1, wherein said blocking means includes a blocking member having one end engaged with a rotary cam rotatable with said key operated member and an opposite end formed in a crank end at which said manual release member is fixed.

11. A system as claimed in claim 10, wherein said restraining means include a restraining block adapted to engage with said crank end portion of said blocking member when said restraining block assumes its restraining position.

12. A system as claimed in claim 11, wherein said restraining means includes a two-position solenoid actuator having a plunger fixed to a reciprocal cam cooperating with said restraining block.

13. A system as claimed in claim 1, wherein said restraining means include a restraining block, a reciprocal cam cooperating with said restraining block, a solenoid actuator having a plunger fixed to said reciprocal cam and a control circuit for said solenoid actuator.

14. A system as claimed in claim 13, wherein said control circuit includes means for indicating that a shift lever is placed at a parking position.

15. A system as claimed in claim 13, wherein said control circuit includes an inhibitor switch.

* * * * *